United States Patent Office 3,378,851
Patented Apr. 23, 1968

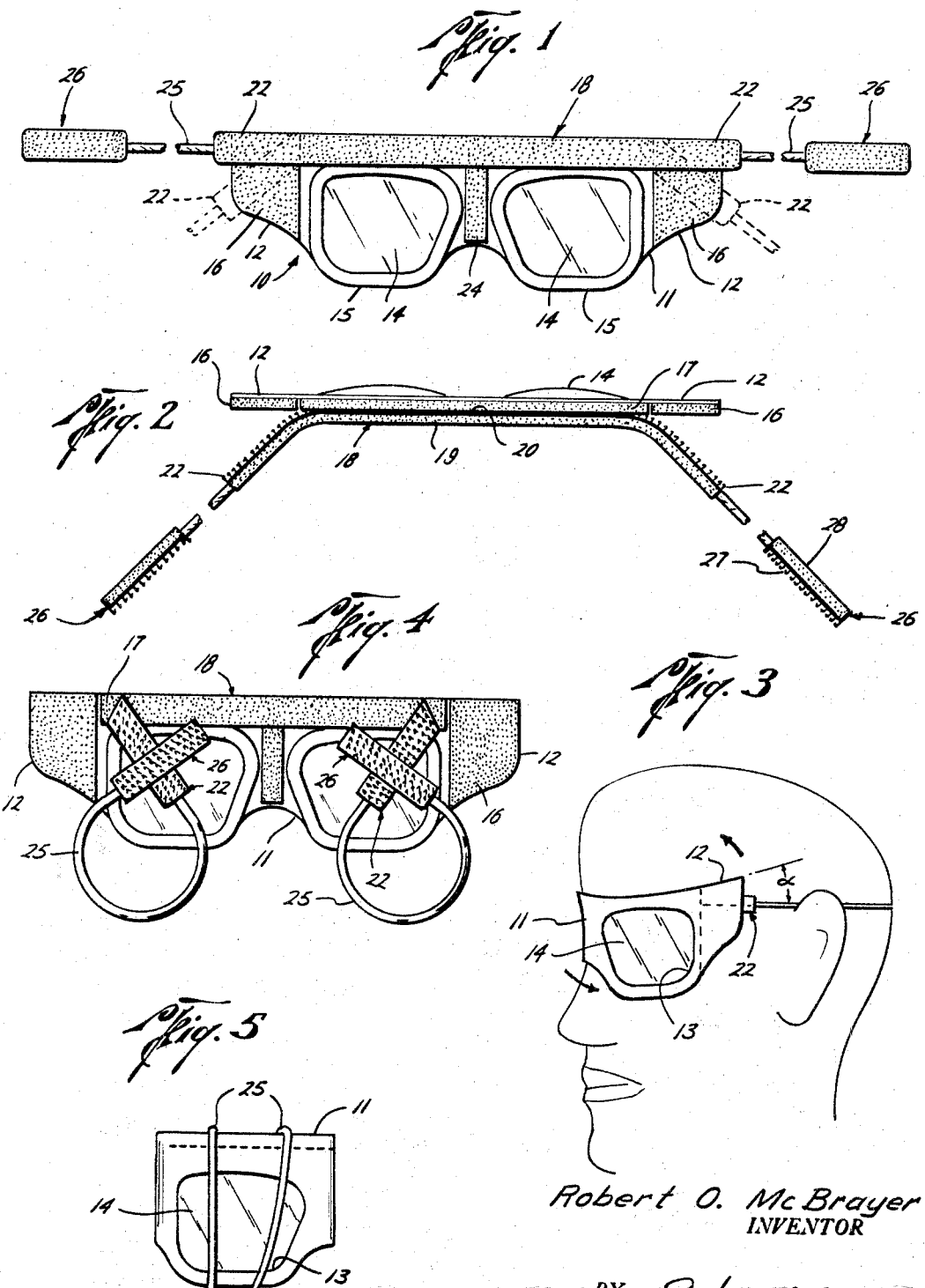

3,378,851
SOFT FRAME ADJUSTABLE EYEGLASSES
Robert O. McBrayer, Houston, Tex., assignor to the United States of America as represented by the Administrator of the National Aeronautics and Space Administration
Filed July 6, 1966, Ser. No. 563,646
4 Claims. (Cl. 2—14)

ABSTRACT OF THE DISCLOSURE

A pliable frame for sunglasses suitable for folding and efficient packaging in emergency survival kits may be constructed from a laminate of nylon and "Velcro." The sunglasses are held in place by two elastic bands which extend from respective sides of the sunglass frame around the wearer's head and are secured together by cooperating "Velcro" tabs on respective terminating ends thereof.

---

The invention described herein was made by an employee of the United States Government and may be manufactured and used by or for the Government for governmental purposes without the payment of any royalties thereon or therefor.

This invention relates to improvements in soft frame glasses, and more particularly relates to a pair of adjustable glasses which can be folded into a small volume for storage.

Whenever the possibility exists that personnel, e.g., aviators, seamen, ski patrols, forest rangers, etc., may become stranded in a hostile environment for long periods of time, it is now a standard practice to provide such personnel with survival kits. An important item in such a kit is a pair of sunglasses which are used to protect the wearer's eyes from harmful glare if he should happen to be stranded on a large body of water, sand, or snow. Since the space available for these glasses within such a kit is severely limited, it is desirable to provide a pair of glasses which can be folded into a minimal volume. Also, since the kit may be subjected to rough handling it is necessary for the glasses to be virtually unbreakable. Furthermore, the glasses should be lightweight and should be adjustable so that a single pair of glasses will comfortably fit a wearer regardless of his particular facial configuration.

In the past most of the glasses used in such kits have been of goggle-like construction, with the frame being made of soft rubber. Although these glasses could be folded, they were still relatively bulky and difficul to store in a small space. Also, this type of glasses utilized metal clips for securing a plastic head band thereto, and it was found that these metal clips had a tendency to break or scratch the lenses under certain conditions.

Glasses having cloth frames have also been suggested for use in these kits. Such glasses can be folded into small volumes and present few problems in regard to breakage. However, these glasses have no means for adjustment, and accordingly are uncomfortable and do not, in most instances, provide a proper fit. This obviously reduces their efficiency.

The present invention provides a pair of glasses that can be folded into a minimal space, are virtually unbreakable, and which are quickly and easily adjustable at time of wearing to insure a proper fit regardless of the wearer's facial features. The glasses are comprised of a heavy cloth frame having a pair of commercially available plastic lenses cemented therein. The frame has a pair of wing flaps, one at each end thereof, which cooperate with a strip of material on the frame to form a means for adjusting the glasses. The actual manner in which this means functions will be set out in detail below. A pair of elastic bands are attached to the glasses to hold them in position while they are being worn. Once the glasses are properly adjusted, they will remain rigidly in place even during periods of violent activity. Also, due to the lightness of the glasses, they are extremely comfortable and eliminate the problem of heavy perspiration previously associated with tight fitting goggle-type glasses.

The actual construction and the apparent advantages of the invention will be better understood by referring to the drawings in which like numerals identify like parts in the different figures and in which:

FIG. 1 is a rear view of a pair of glasses made in accordance with the present invention;

FIG. 2 is a top view of the glasses of FIG. 1;

FIG. 3 is a perspective view of the glasses of FIG. 1 in position on a wearer;

FIG. 4 is a rear view of the glasses of FIG. 1 in a partially folded position; and FIG. 5 is a front view of the glasses of FIG. 1 in a fully folded position.

Referring more specifically to FIG. 1, glasses 10 comprise a frame 11 which is made from cloth, or like material, preferably heavy nylon cloth. Frame 11 has a wing flap 12 at either end thereof which forms an integral part of the frame. A pair of openings 13 (FIGS. 3 and 5) are provided in frame 11 to which lenses 14 are fitted. Preferably these lenses are tinted and are of the plastic, unbreakable type commonly used in several commercially available sunglasses. However, it should be recognized that other types of lenses could be used without departing from the invention. Lenses 14, which are larger than openings 13, are positioned over said openings from the rear side of frame 11 and are held in place by cloth rings 15 which are cemented, sewed, or otherwise secured to frame 11.

Pads 16 of pile material, cut in the same configuration as flaps 12, are secured to said flaps by cementing or the like. This pile material comprises a backing of a dimensionally stable woven nylon fabric having on one side thereof a large plurality of tiny, upstanding loops of very fine thread or other filamentary material, this side being the pile side. A strip 17 of this pile material having substantially the same thickness as pads 16 is cemented or otherwise secured to frame 11 along the upper rear edge thereof between flaps 12 (see FIG. 2).

A composite strip element 18 is secured along a portion of its length to strip 17 by cementing or the like (see FIGS. 2 and 4). Strip element 18 is comprised of a strip 19 of pile material and a strip 20 of hook material which have their respective backings cemented together. Hook strip 20 is comprised of material which has the same backing material as the pile material and has a plurality of tiny hooks extending outwardly from one side of the backing, this side being the hook side. The pile and hook material described herein is commonly referred to as hook tape, and is known commercially as Velcro.

Strip element 18 is secured to strip 17 so that the pile side of strip 19 is exposed outwardly. Those portions of element 18 which are not secured to strip 17 form a pair of loose tabs 22, one at each end of element 18. It can be seen from FIGS. 2 and 4 that the hook side of strip 20 will be exposed on that side of tabs 22 which face the flaps 12. When the glasses are to be worn, the hook side of tabs 22 cooperates with the pile material 16 on flaps 12 to provide means for adjusting the glasses, as will be more fully explained below. If desired, strip 17, element 18, and frame 11 can be sewed along their common length to insure better integrity of the glasses. A pad 24 of pile material is secured to frame 11 as shown in FIG. 1 to provide a cushion for the nose when the glasses are in place.

Individual elastic bands 25 are secured to each of tabs 22, and each have an elongated composite tip 26 secured to its outer end. Tips 26 are formed from a strip 27 of pile material and a strip 28 of hook material having their respective backings secured together in the same manner as strip element 18. It can easily be seen that the hook material of one tip can cooperate with the pile material on the other to secure the elastic bands 25 together to form a continuous, adjustable headband for holding the glasses in place. It should be noted that by using elongated tips 26 and two bands 25 instead of a single elastic band, that the actual length of the headband can be adjusted without relying solely upon the stretch of the elastic which in some cases cause discomfort when stretched too far. With the glasses in an unfolded position, as shown in FIG. 1, they are ready to be worn. The glasses can be adjusted at that time by moving tabs 22 from the position shown by the solid lines in FIG. 1 to a second position shown by the dotted lines in FIG. 1. By merely pressing the hook side of tab 22 into the pile material of flap 12, tab 22 can be locked at an angle $\alpha$ with respect to the top of flap 12 (FIG. 3). The actual angle $\alpha$ at which tabs 22 will be set will depend upon the individual facial contour, since by increasing the angle the bottom of the glasses can be canted more and more toward the cheeks of the wearer (see arrows in FIG. 3). To insure the right cant for a particular wearer, it is best to don the glasses before adjusting same. This is done by positioning the glasses and coupling tips 26 together to adjust the elastic bands 25 which hold the glasses in place. It is then a simple and easy task for wearer to manipulate the tabs 22 to different positions with respect to flaps 12 until a comfortable fit is obtained. As explained briefly below, the hook and pile material when pressed together forms a strong union which can be easily released and reused almost indefinitely. This makes the glasses extremely durable and for all intents and purposes unbreakable, the latter depending only on the lenses used.

The hook and pile material, as explained above, is commercially available under the trademark Velcro, and functions as follows. When the hook material which contains tiny hooks of stiff but flexible plastic is pressed into the pile material which contains a large plurality of loops of plastic filamentary material having a relatively high tensile strength, a large number of hooks engage the loops causing an interlocking to occur between the hook and the pile material. The hooks and loops interlock so strongly that a substantial force is required to separate the two. The relative strength of the hooks and the loops are so proportioned that when a force sufficient to pull them apart is exerted, the hooks and loops disengage without pulling either the hooks or loops from their respective backings. This allows the fastening action between the hook and pile material to be renewed indefinitely.

To fold the glasses for storage tabs 22 are pulled loose from flaps 12 and are folded back, as shown in FIG. 4. The pile side of tips 26 are then pressed onto the exposed hook side of tabs 22. Next, flaps 12 are folded over tabs 22 and tips 26 and the glasses are folded at their midpoint (pad 24). Elastic bands 25 are then stretched around the folded glasses to hold them in the position shown in FIG. 5. In this position the glasses occupy substantially less volume than an ordinary package of cigarettes, and can easily be carried in a shirt pocket without inconvenience.

While a particular embodiment of the glasses has been illustrated and described, it will be obvious that changes and modifications can be made without departing from the spirit of the invention and the scope of the appended claims.

What is claimed and desired to be secured by Letters Patent is:

1. A pair of adjustable eyeglasses capable of being folded into a minimal volume, comprising:
   a frame of soft, pliable material having two eye openings therethrough, and having a foldable flap extending from each end thereof;
   a pair of lenses secured to said frame and covering said eye openings;
   a pair of elongated adjustment tabs, each of said tabs being secured respectively to opposite ends of said frame so that each tab is attached at one of its ends to said frame and extends loosely over the foldable flap at the same respective end of said frame, said tabs being positioned so that the longitudinal axes of said tabs will normally be substantially parallel to the top edges of said frame and said flaps;
   means attached to said tabs for securing said eyeglasses on the head of a wearer; and
   cooperable means on said flaps and said tabs for releasably securing said tabs to said flaps in any of a plurality of different positions wherein the longitudinal axes of the tabs will form a different angle with respect to the top edges of said flaps in each of said positions to thereby provide a means for easily adjusting said eyeglasses to the particular facial contour of an individual wearer.

2. A pair of adjustable eyeglasses as described in claim 1 wherein said cooperable means on said flaps and said tabs comprises:
   hook material having a plurality of tiny, upstanding hooks thereon, said hook material secured to either said tabs or said flaps; and
   pile material having a plurality of tiny, upstanding loops thereon, said pile material secured to the other of said tabs or said flaps whereby said hooks on said hook material will cooperate with said loops on said pile material to thereby form a releasable connection between said tabs and said flaps wherever said hook and pile materials are pressed together.

3. A pair of adjustable eyeglasses as described in claim 2 wherein the soft pliable material of which the frame is comprised is heavy, nylon cloth.

4. A pair of adjustable eyeglasses as described in claim 2 wherein said means for securing said eyeglasses in place comprises an elastic band.

References Cited
UNITED STATES PATENTS

| | | | |
|---|---|---|---|
| 1,161,061 | 11/1915 | Malcom | 2—14.4 |
| 2,323,518 | 7/1943 | Cochran | 351—63 X |
| 2,527,027 | 10/1950 | Mull | 2—14.1 |
| 2,907,041 | 10/1959 | Finn | 2—14.4 |
| 3,235,882 | 2/1966 | Coleman. | |

FOREIGN PATENTS

| | | |
|---|---|---|
| 363,594 | 12/1931 | Great Britain. |
| 579,754 | 8/1946 | Great Britain. |

HERBERT F. ROSS, *Primary Examiner.*